Dec. 6, 1949  E. NELSON ET AL  2,490,455
MACHINE FOR CUTTING VEGETABLES
OR THE LIKE MATERIAL
Filed Aug. 15, 1947  4 Sheets-Sheet 2

Ernest Nelson
Harold Nelson
Thomas B. Nelson
Frank Nelson  Inventors
J. Victor Armstrong  Attorney Dec. 6, 1949 E. NELSON ET AL 2,490,455
MACHINE FOR CUTTING VEGETABLES
OR THE LIKE MATERIAL
Filed Aug. 15, 1947 4 Sheets-Sheet 4

Ernest Nelson
Harold Nelson
Thomas B. Nelson
Frank Nelson
Inventors

R. Victor Armstrong
Attorney

Patented Dec. 6, 1949

2,490,455

UNITED STATES PATENT OFFICE 2,490,455

MACHINE FOR CUTTING VEGETABLES OR THE LIKE MATERIAL

Ernest Nelson, Harold Nelson, Thomas Butler Nelson, and Frank Nelson, Preston, England Application August 15, 1947, Serial No. 768,846
In Great Britain February 5, 1947

8 Claims. (Cl. 146—78)

The present invention relates to an improved machine for the cutting of potatoes and other root crops into small pieces.

An object of the present invention is to provide a machine which will be of simple construction and by which at will root crops such as potatoes may be either delivered in the form of thin slices or alternatively in the form of chips or bars.

According to the present invention a horizontal rotary blade finger periodically passes over the face of the outlet of a hopper for the potatoes or other material to sever slices therefrom, this material being supported between successive passes of the blade by means of a plate disposed in spaced relationship to the outlet of the hopper.

The invention is further described with reference to the accompanying drawings in which—

Figure 1:
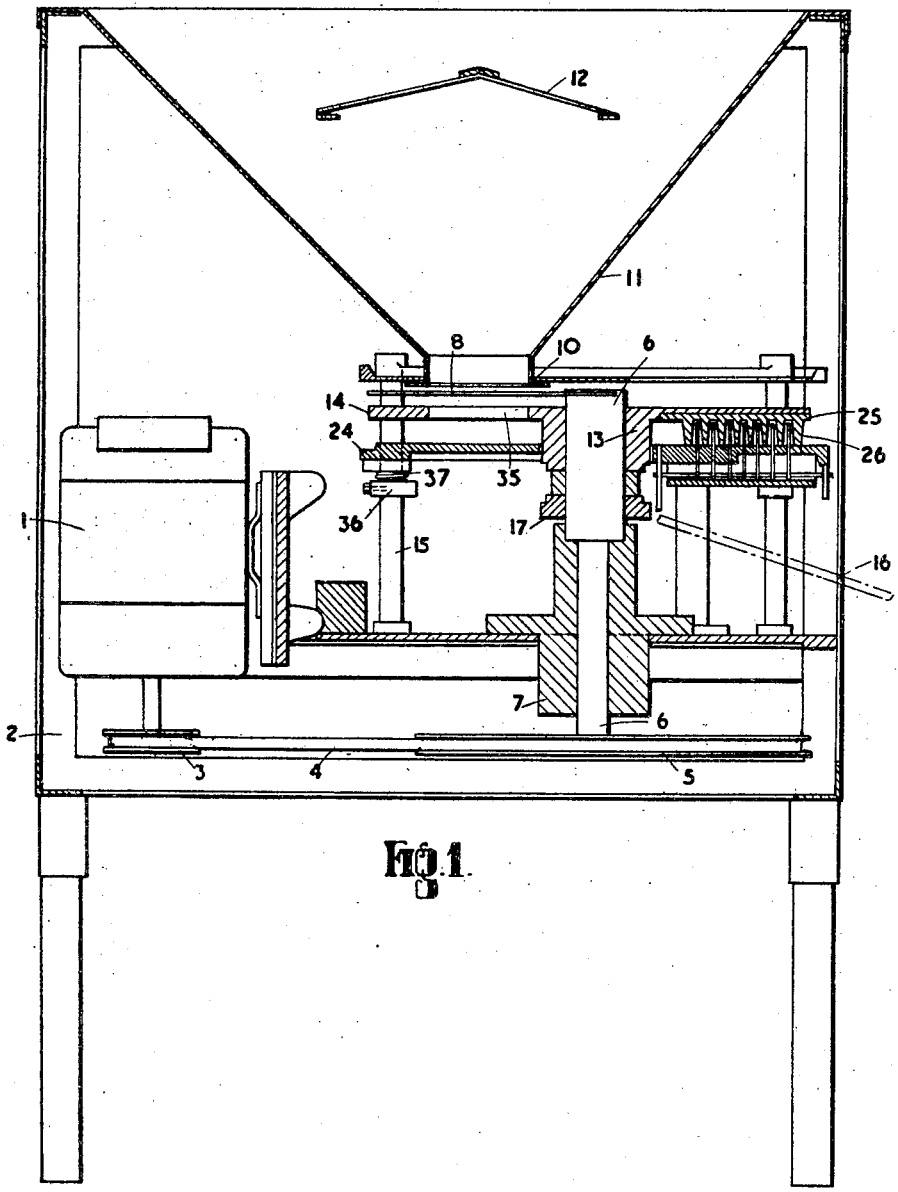
Fig. 1 is a side elevation of one form of construction of machine.
Figure 2:
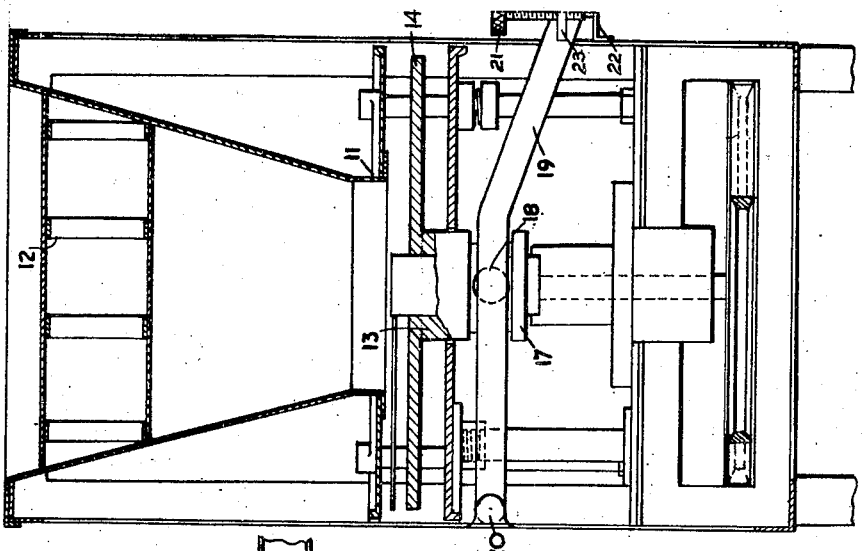
Fig. 2 is a corresponding end view.
Figure 3:
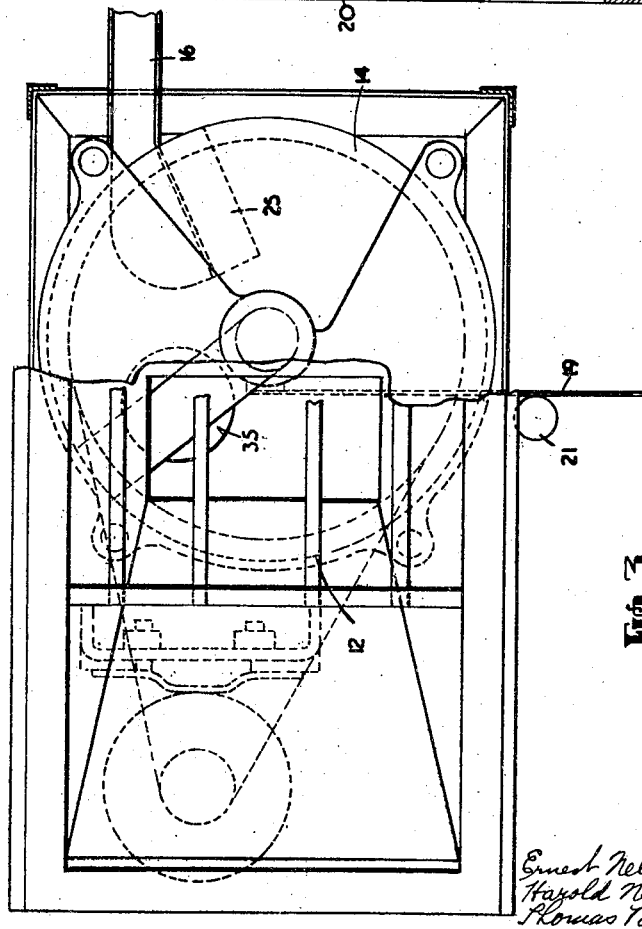
Fig. 3 is a corresponding plan view, partly in section.

An electric motor 1 or other prime mover mounted on a frame 2 drives by means of a pulley 3 and belt 4 a pulley 5 on a shaft 6 mounted in a bearing 7 on the frame 2. This shaft 6 carries a blade finger 8 and, angularly displaced therefrom, a sweeper arm 25.

As will be seen, the blade finger 8 periodically sweeps over the base 10 of a hopper 11 into which root crops to be sliced are placed, this hopper being preferably provided with an internal guard 12, so that the operator can not directly obtain access to the base 10 and thus run the risk of having his fingers severed by this rotary blade 8 when the machine is in operation.

Mounted about the shaft 6 is a bush 13 carrying a plate 14. It will consequently be seen that articles such as potatoes will fall through the opening in the base 10 of the hopper and will temporarily be supported upon the plate 14 until a slice is cut therefrom, whereupon this slice passes through an opening 35 in plate 14 and comes to rest on plate 24, then the slice is swept round the plate 24 by means of the sweeper arm 25 until it comes over a chute 16 down which it can fall into a suitable receptacle.

The bush 13 has a collar 17 upon it in which can engage a roller 18 on a lever 19 pivoted at 20 to the frame, which lever 19 can be set in any position of adjustment by means of a set-screw 21 mounted in a bush 22 on the frame and having a pin and slot connection 23 with the lever 19. It will consequently be seen that by suitably adjusting the set-screw 21 the spacing of the plate 14 from the base of the hopper 11 can be adjusted as desired to give any desired thickness of slice. The plate 24 is perforated to be guided on spindles 15 supported in the frame of the machine and is supported on compression springs 37 resting on collars 36 on the spindles 15 so that it will be permanently elastically held against the lower end of fingers 26 on the sweeper arm 25.

The severed slice of potato or other vegetable will then fall past the narrow platform 14 upon which it has been supported whilst it has been cut by the blade 8, and will fall upon the base platform 24 and will finally be swept off this platform 24 through a gap in it by means of the sweeper arm 25 to fall down upon the chute 16 and be ejected.

Figure 4:
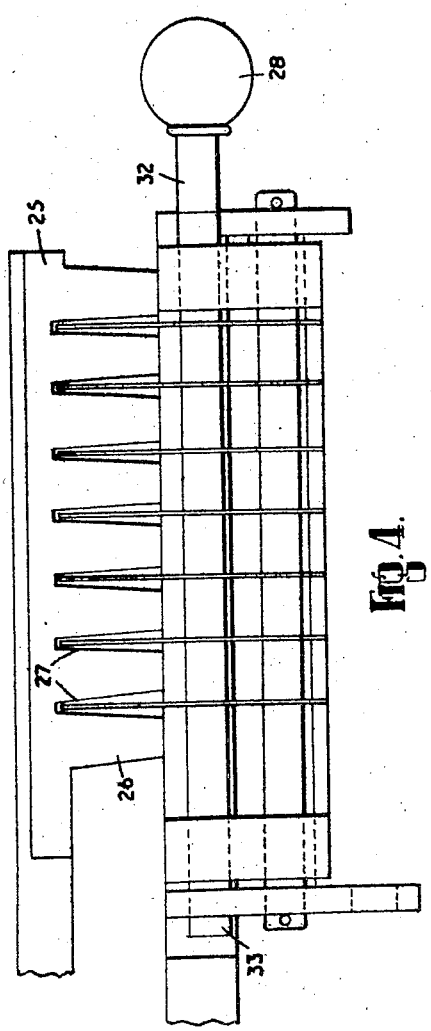
Fig. 4 is a detail view of the chip or bar cutting device on an enlarged scale.
Figure 5:
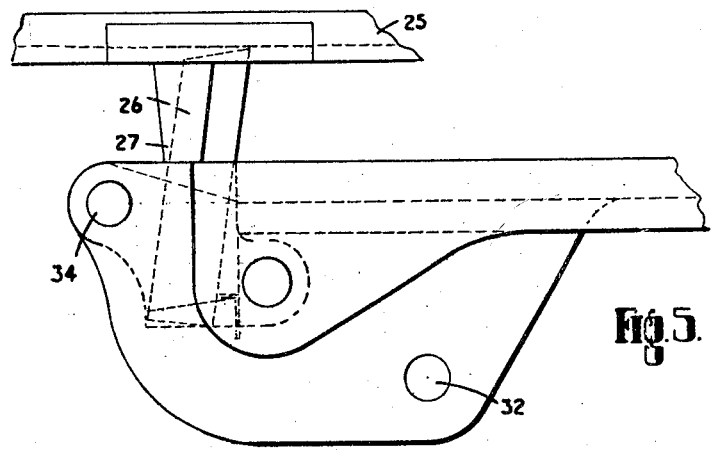
Figs. 5 and 6 are detail views of the support for the chip or bar cutting blades mounting.
Figure 6:
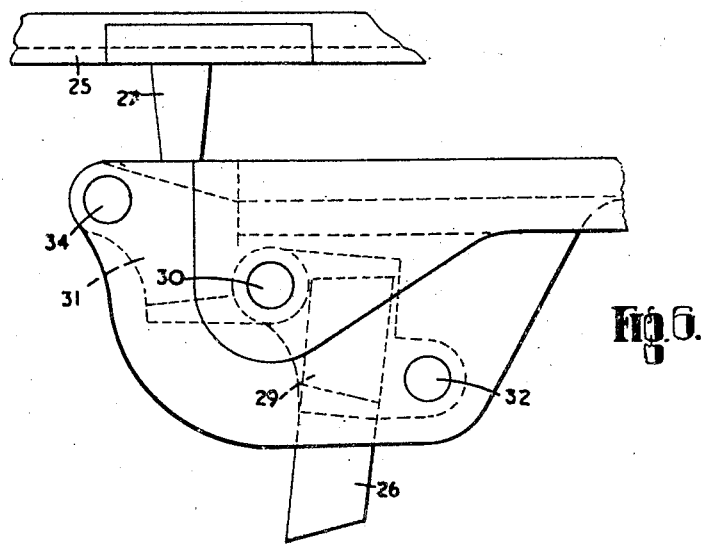

Should, however, it be desired that this slice be severed into slivers or bars, then this sweeper arm 25, which has a number of projecting teeth 26 in the form of a comb (see Fig. 4), will serve to push the slices against a plurality of parallel blades 27 which can be brought up through a gap in the platform 24 by means of an operating handle 28. These blades 27 are mounted on a holder 29 pivoted at 30 to a bracket 31 on the frame, which holder 29 is perforated to receive the shaft 32 of the handle 28 which is displaceable axially, so that its end 33 can either engage a socket in the frame locking the blades 27 in the position of Fig. 6, or this can be withdrawn to turn the blades round into the position shown in Fig. 5, in which case the end 33 of the shaft 32 of the handle 28 can engage into a socket 34 in the frame.

We claim as our invention:

1. A machine for cutting vegetables including in combination a hopper, a rotary blade, means to sweep said blade over the mouth of the hopper, a gapped supporting plate beneath the mouth of said hopper to support vegetables projecting through the mouth of the hopper between successive passes of the blade, means to rotate said plate in synchronism with the blade, a second plate disposed below said supporting plate and slidably mounted upon spindles disposed around its periphery, a sweeper arm rotating in synchronism with the blade, depending fingers on said sweeper arm, springs on said spindles maintaining said second plate in contact with the lower ends of said fingers, and a plurality of cutting blades disposed in a plane at right angles to said second plate and spaced similarly to said fingers to allow these to pass between the blades.

2. A machine for cutting vegetables including in combination a hopper, a rotary blade, means to sweep said blade over the mouth of the hopper, a gapped supporting plate beneath the mouth of the hopper to support vegetables projecting through the mouth of said hopper between successive passes of the blade, means to rotate said plate in synchronism with the blade, a second plate disposed below said supporting plate and slidably mounted upon spindles disposed around its periphery, sweeper arm rotating in synchronism with the blade, depending fingers on said sweeper arm, springs maintaining said second plate in contact with the lower ends of said fingers, a plurality of cutting blades disposed in a plane at right angles to said second plate and spaced similarly to said fingers to allow these to pass between the blades, and means to displace said cutting blades from a position in which they lie within range of said fingers to a position in which they lie out of range of said fingers.

3. A machine for cutting vegetables including in combination a hopper, a rotary blade, means to sweep said blade over the mouth of the hopper, a supporting plate beneath the mouth of said hopper to support vegetables projecting through the mouth of the hopper between successive passes of the blade, means to rotate said plate in synchronism with the blade, means to interrupt the support by said plate of a severed piece, means to adjust the spacing of said supporting plate relatively to the mouth of said hopper, a second plate disposed below said supporting plate and slidably mounted upon spindles disposed around its periphery, a sweeper arm rotating in synchronism with the blade, depending fingers on said sweeper arm, springs on said spindles maintaining said second plate in contact with the lower ends of said fingers, and a plurality of cutting blades disposed in a plane at right angles to said second plate and spaced similarly to said fingers to allow these to pass between the blades.

4. A machine for cutting vegetables including in combination a hopper, a rotary blade, means to sweep said blade over the mouth of the hopper, a supporting plate beneath the mouth of the hopper to support vegetables projecting through the mouth of said hopper between successive passes of the blade, means to rotate said plate in synchronism with the blade, means to interrupt the support by said plate of a severed piece, means to adjust the spacing of said supporting plate relatively to the mouth of said hopper, a second plate disposed below said supporting plate and slidably mounted upon spindles disposed around its periphery, a sweeper arm rotating in synchronism with the blade, depending fingers on said sweeper arm, springs maintaining said second plate in contact with the lower ends of said fingers, a plurality of cutting blades disposed in a plane at right angles to said second plate and spaced similarly to said fingers to allow these to pass between the blades, and means to displace said cutting blades from a position in which they lie within range of said fingers to a position in which they lie out of range of said fingers.

5. A machine for cutting vegetables including in combination a hopper, a rotary blade, means to sweep said blade over the mouth of said hopper including a shaft carrying said blade, a supporting plate beneath the mouth of said hopper to support vegetables projecting through the mouth of the hopper between successive passes of the blade, means to rotate said supporting plate in synchronism with the blade including a bush attached to said supporting plate and slidably mounted on said shaft, means to interrupt the support by said plate of a severed piece, means to adjust the spacing of said supporting plate relatively to the mouth of said hopper including a lever pivotally mounted at one end thereof to the frame of the machine, intermediate the ends of said lever a roller co-operating with a circumferentially grooved portion of said bush and means for adjusting the position of the outer end of said lever, a second plate disposed below said supporting plate and slidably mounted upon spindles disposed around its periphery, a sweeper arm rotating in synchronism with the blade, depending fingers on said sweeper arm, springs on said spindles maintaining said second plate in contact with the lower ends of said fingers, and a plurality of cutting blades disposed in a plane at right angles to said second plate and spaced similarly to said fingers to allow these to pass between the blades.

6. A machine for cutting vegetables including in combination a hopper, a rotary blade, means to sweep said blade over the mouth of said hopper including a shaft carrying said blade, a supporting plate beneath the mouth of said hopper to support vegetables projecting through the mouth of said hopper between successive passes of the blade, means to rotate said supporting plate in synchronism with said blade including a bush attached to said supporting plate and slidably mounted on said shaft, means to interrupt the support by said plate of a severed piece, means to adjust the spacing of said supporting plate relatively to the mouth of said hopper including a lever pivotally mounted at one end thereof to the frame of the machine, intermediate the ends of said lever a roller co-operating with a circumferentially grooved portion of said bush and means for adjusting the position of the outer end of said lever, a second plate disposed below said supporting plate and slidably mounted upon spindles disposed around its periphery, a sweeper arm rotating in synchronism with the blade, depending fingers on said sweeper arm, springs maintaining said second plate in contact with the lower ends of said fingers, a plurality of cutting blades disposed in a plane at right angles to said second plate and spaced similarly to said fingers to allow these to pass between the blades, and means to displace said cutting blades from a position in which they lie within range of said fingers to a position in which they lie out of range of said fingers.

7. A machine for cutting vegetables including in combination a hopper, a rotary blade, means to sweep said blade over the mouth of said hopper including a shaft carrying said blade, a supporting plate beneath the mouth of said hopper to support vegetables projecting through the mouth of the hopper between successive passes of the blade, means to rotate said supporting plate in synchronism with the blade including a bush attached to said supporting plate and slidably mounted on said shaft, means to interrupt the support by said plate of a severed piece, means to adjust the spacing of said supporting plate relatively to the mouth of said hopper including a lever pivotally mounted at one end thereof to the frame of the machine, intermediate the ends of said lever a roller co-operating with a circumferentially grooved portion of said bush and means for adjusting the position of the outer end of said lever, a second plate disposed below said supporting plate and slidably mounted upon spindles disposed around its periphery, a sweeper arm rotating coaxially with and in synchronism with said blade, depending fingers on said sweeper arm, springs on said spindles maintaining said second plate in contact with the lower ends of said fingers, and a plurality of cutting blades disposed in a plane at right angles to said second plate and spaced similarly to said fingers to allow these to pass between the blades.

8. A machine for cutting vegetables including in combination a hopper, a rotary blade, means to sweep said blade over the mouth of said hopper including a shaft carrying said blade, a supporting plate beneath the mouth of said hopper to support vegetables projecting through the mouth of said hopper between successive passes of the blade, means to rotate said supporting plate in synchronism with said blade including a bush attached to said supporting plate and slidably mounted on said shaft, means to interrupt the support by said plate of a severed piece, means to adjust the spacing of said supporting plate relatively to the mouth of said hopper including a lever pivotally mounted at one end to the frame of the machine, intermediate the ends of said lever a roller co-operating with a circumferentially grooved portion of said bush and means for adjusting the position of the outer end of said lever, a second plate disposed below said supporting plate and slidably disposed upon spindles disposed around its periphery, a sweeper arm rotating coaxially with and in synchronism with said blade, depending fingers on said sweeper arm, springs on said spindles maintaining said second plate in contact with the lower ends of said fingers, a plurality of cutting blades disposed in a plane at right angles to said second plate and placed similarly to said fingers to allow these to pass between the blades, and means to displace said cutting blades from a position in which they lie within range of said fingers to a position in which they lie out of the range of said fingers.

ERNEST NELSON.
HAROLD NELSON.
THOMAS BUTLER NELSON.
FRANK NELSON.

REFERENCES CITED

The following references are of record in the file of this patent:

UNITED STATES PATENTS

| Number | Name | Date |
|---|---|---|
| 308,629 | Reed | Dec. 2, 1884 |
| 335,664 | Wicker | Feb. 9, 1886 |
| 675,284 | Matthiessen | May 28, 1901 |
| 1,297,373 | Luther | Mar. 18, 1919 |
| 1,794,743 | Urschel | Mar. 3, 1931 |
| 1,939,279 | Rogalewski | Dec. 12, 1933 |
| 2,076,749 | Spires et al. | Apr. 13, 1937 |

FOREIGN PATENTS

| Number | Country | Date |
|---|---|---|
| 307,230 | Germany | Aug. 5, 1918 |